(12) United States Patent
Migita

(10) Patent No.: US 7,380,520 B2
(45) Date of Patent: Jun. 3, 2008

(54) KEEPING CASE FOR SMALL ANIMALS

(75) Inventor: Yuzo Migita, Minoo (JP)

(73) Assignee: Sanko Shokai Inc., Minoo-shi (JP)

( * ) Notice: Subject to any disclaimer, the term of this patent is extended or adjusted under 35 U.S.C. 154(b) by 218 days.

(21) Appl. No.: 11/099,516

(22) Filed: Apr. 6, 2005

(65) Prior Publication Data

US 2005/0229865 A1    Oct. 20, 2005

(30) Foreign Application Priority Data

Apr. 16, 2004    (JP)    ............... 2004-120999

(51) Int. Cl.
*A01K 1/03*    (2006.01)
(52) U.S. Cl. ..................... 119/479; 119/462
(58) Field of Classification Search ............... 119/479, 119/452, 459, 462, 482, 269
See application file for complete search history.

(56) References Cited

U.S. PATENT DOCUMENTS

| | | | | |
|---|---|---|---|---|
| 1,545,671 A * | 7/1925 | Lindemann | ................ | 119/462 |
| 2,914,022 A * | 11/1959 | Hinton | ................ | 119/463 |
| 3,246,630 A * | 4/1966 | Dearing et al. | ................ | 119/165 |
| 3,742,909 A * | 7/1973 | Yellin | ................ | 119/479 |
| 3,771,686 A * | 11/1973 | Brison | ................ | 220/4.21 |
| 3,815,549 A * | 6/1974 | Opmeer | ................ | 119/459 |
| 4,287,854 A * | 9/1981 | Hansen et al. | ................ | 119/455 |
| 4,319,545 A * | 3/1982 | Sou | ................ | 119/474 |
| 4,586,463 A * | 5/1986 | Braeuner | ................ | 119/462 |
| 4,696,257 A * | 9/1987 | Neary et al. | ................ | 119/166 |
| 4,838,204 A * | 6/1989 | Young | ................ | 119/471 |
| 4,991,544 A * | 2/1991 | Galvin et al. | ................ | 119/469 |
| 5,010,848 A * | 4/1991 | Rankin | ................ | 119/461 |
| 5,092,270 A * | 3/1992 | Simons et al. | ................ | 119/453 |
| 5,328,049 A * | 7/1994 | Ritzow | ................ | 220/315 |
| 5,448,964 A * | 9/1995 | Takimoto | ................ | 119/463 |
| 5,533,466 A * | 7/1996 | Kohus et al. | ................ | 119/459 |
| 5,771,841 A * | 6/1998 | Boor | ................ | 119/452 |
| 5,775,261 A * | 7/1998 | Shaw | ................ | 119/482 |
| 5,794,567 A * | 8/1998 | Itzhak | ................ | 119/416 |
| 5,803,018 A * | 9/1998 | Liou | ................ | 119/461 |
| 5,957,086 A * | 9/1999 | Gallardo | ................ | 119/429 |
| 5,957,087 A * | 9/1999 | Bonder et al. | ................ | 119/429 |
| 5,996,536 A * | 12/1999 | King | ................ | 119/459 |
| 6,032,614 A * | 3/2000 | Tominaga | ................ | 119/452 |
| 6,129,052 A * | 10/2000 | Huang | ................ | 119/461 |
| 6,301,739 B1 * | 10/2001 | Cazaux | ................ | 15/161 |
| 6,338,318 B1 * | 1/2002 | Apichom | ................ | 119/497 |
| 6,715,445 B2 * | 4/2004 | Plante et al. | ................ | 119/461 |

(Continued)

FOREIGN PATENT DOCUMENTS

JP       8-154521        6/1996

*Primary Examiner*—Yvonne R. Abbott
(74) *Attorney, Agent, or Firm*—Kratz, Quintos & Hanson, LLP

(57) ABSTRACT

A keeping case provided with an upward-opening lower receiving base having a peripheral wall, a downward-opening small animal container disposed on the lower receiving base, and an upward-opening waste-receiving tray stored in the lower receiving base as to be drawn out. An inner brim portion along the peripheral wall is protruding from a middle position in vertical direction of the peripheral wall. An opening upper edge of the waste-receiving tray is hidden by the inner brim portion in a top view.

5 Claims, 4 Drawing Sheets

U.S. PATENT DOCUMENTS

| | | | |
|---|---|---|---|
| 6,763,784 B1 * | 7/2004 | Liu | 119/452 |
| 6,832,580 B2 * | 12/2004 | Marchioro | 119/452 |
| 6,923,143 B2 * | 8/2005 | Plante et al. | 119/462 |
| 7,032,540 B2 * | 4/2006 | Bonner et al. | 119/455 |
| 2005/0235923 A1 * | 10/2005 | Niki | 119/479 |

* cited by examiner

KEEPING CASE FOR SMALL ANIMALS

BACKGROUND OF THE INVENTION

1. Field of the Invention

This invention relates to a keeping case for small animals such as rabbits and ferrets.

2. Description of the Related Art

A keeping case for small animals such as rabbits and ferrets is provided with an upward-opening lower receiving base, a downward-opening upper cage (small animal container), and a waste-receiving tray (drawer tray) stored in the lower receiving base as to be drawn out.

In a conventional keeping case as described above, as shown in FIG. 7, an upper cage 43 is placed on a staged portion 42 formed near an opening upper edge of a lower receiving base 41, and a waste-receiving tray 44, for receiving waste such as food left (scattered) by the small animals, is disposed on a bottom portion side of the lower receiving base 41 (refer to Japanese provisional publication No. H8-154521, for example).

Further, although not shown in FIG. 7, a floor plate of net is placed on a second staged portion formed on a middle portion in vertical direction below the first staged portion 42 of the lower receiving base 41 and above the waste-receiving tray 44.

In the conventional keeping case, the waste-receiving tray 44 is disposed in the lower receiving base 41 as to form a gap with an inner face 45 of peripheral wall of the lower receiving base 41 for drawing the waste-receiving tray 44. Therefore, waste 47 such as excrement, dropped hair, and food remainder of the small animals drops on a bottom face 46 of the lower receiving base 41 through the gap, so cleaning of the case is unsanitary and causes much labor because the bottom face 46 of the lower receiving base 41 needs cleaning after the waste-receiving tray 44 is drawn out.

And, the construction of the lower receiving base 41 is complicated with the two staged portions and not preferable for its appearance.

It is therefore an object of the present invention to provide a keeping case for small animals with which the waste such as excrement, dropped hair, and food remainder of the small animals can be certainly dropped within the waste-receiving tray which is very easily cleaned, that is to say, the waste is certainly gathered in the receiving tray without falling out of the receiving tray, the construction is simple, the opening lower edge of the small animal container is placed on and held by the inner brim portion and hidden by the peripheral wall, and the appearance of the case is made preferably simple because the peripheral face of the peripheral wall is made a fine vertical smooth face.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
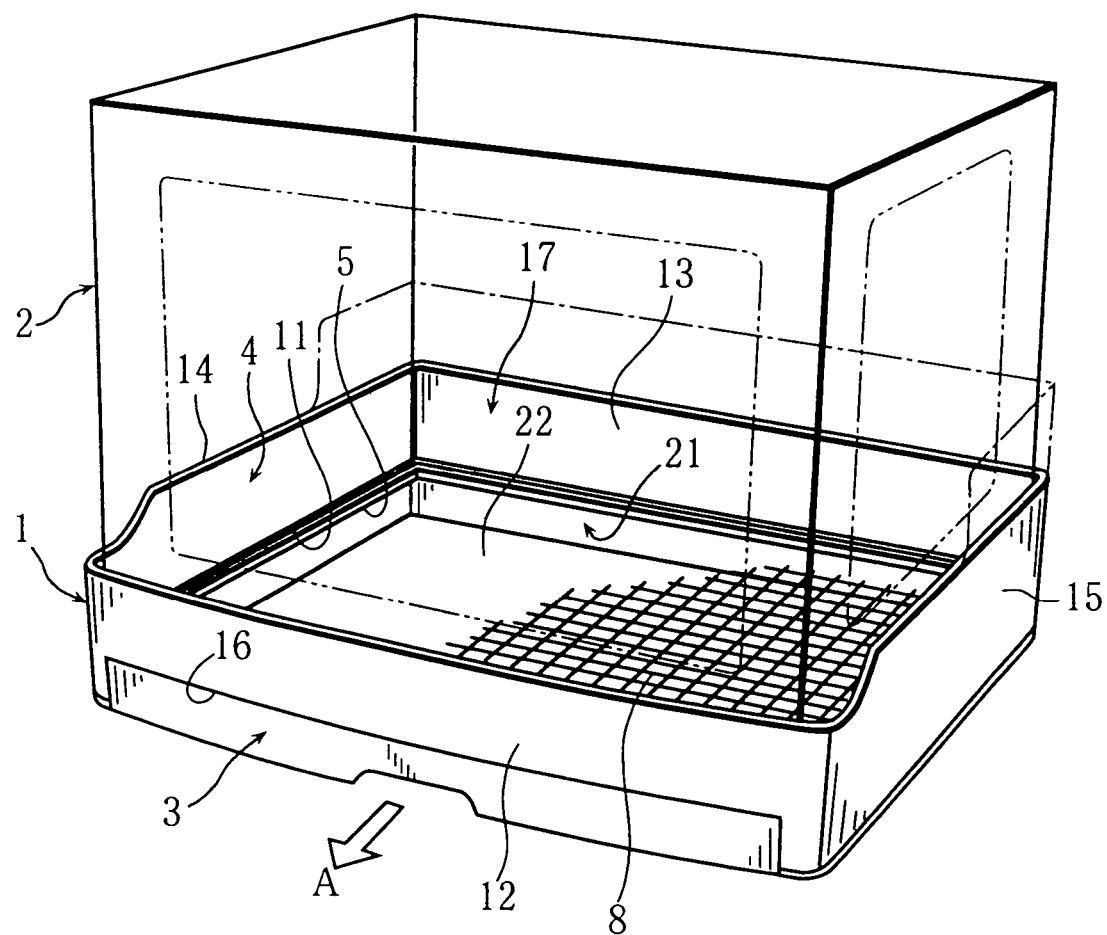
FIG. 1 is a perspective view showing an embodiment of a keeping case for small animals of the present invention.

FIG. 1 is a perspective view showing an embodiment of a keeping case for small animals of the present invention to contain and keep small animals such as rabbits and ferrets.

This keeping case is provided with an upward-opening lower receiving base (lower base) 1 having a peripheral wall 4, a downward-opening small animal container 2 disposed on the lower receiving base 1, and an upward-opening waste-receiving tray 3 stored in the lower receiving base 1 as to be drawn out.

Figure 6:
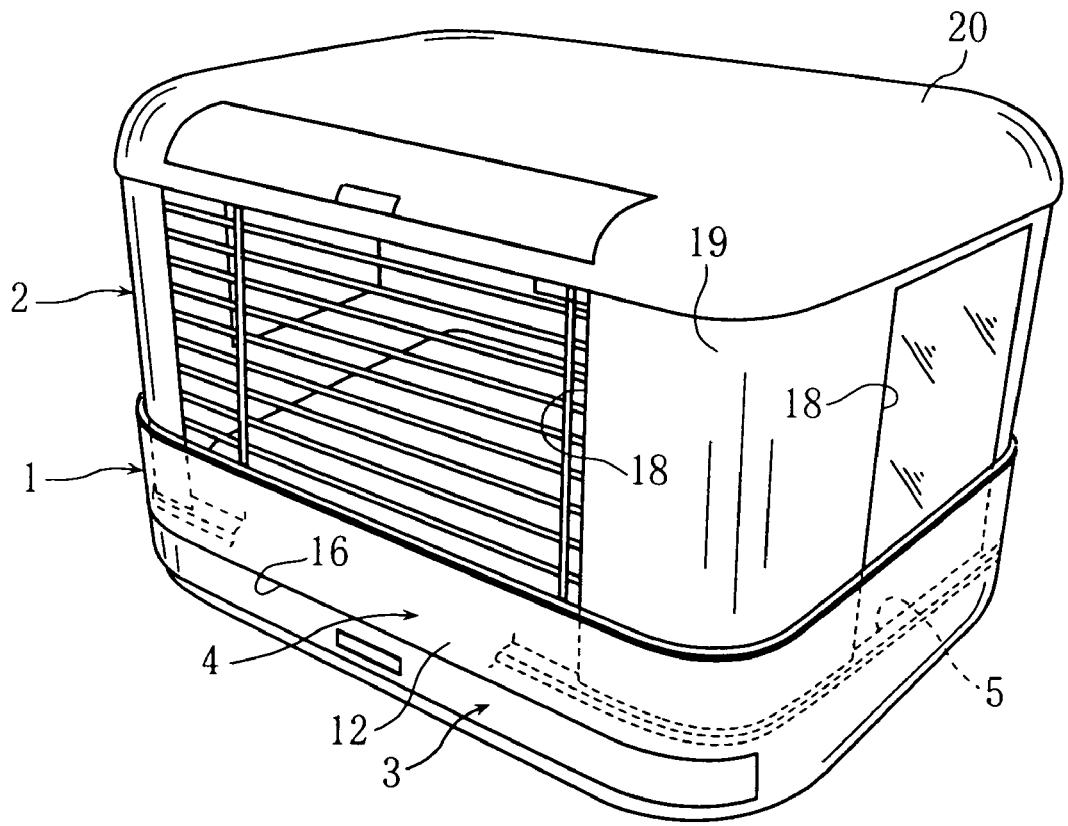
FIG. 6 is a perspective view of a principal portion showing still another embodiment of the keeping case for small animals.
Figure 7:
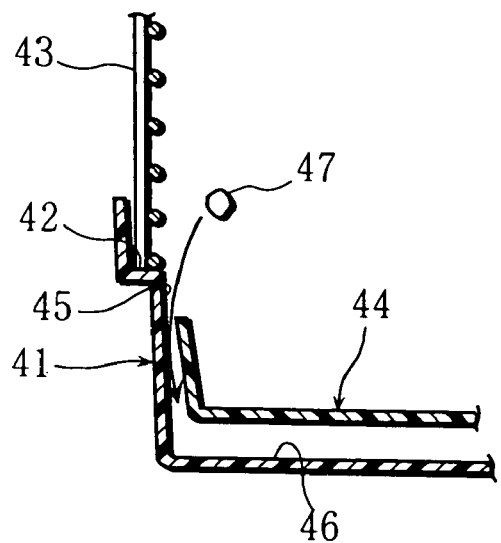
FIG. 7 is a cross-sectional view of a principal portion of a conventional keeping case for small animals.

Although only the outline of the small animal container 2 is shown with solid lines to facilitate explanations of inward parts (inner portions) in FIG. 1, the case may be composed of an upper case having a side wall and a window portion formed in the side wall as shown in FIG. 6, and, although not shown in Figures, the case may be a downward-opening cage of which upper face and side peripheral face are netted (grid).

Figure 2:
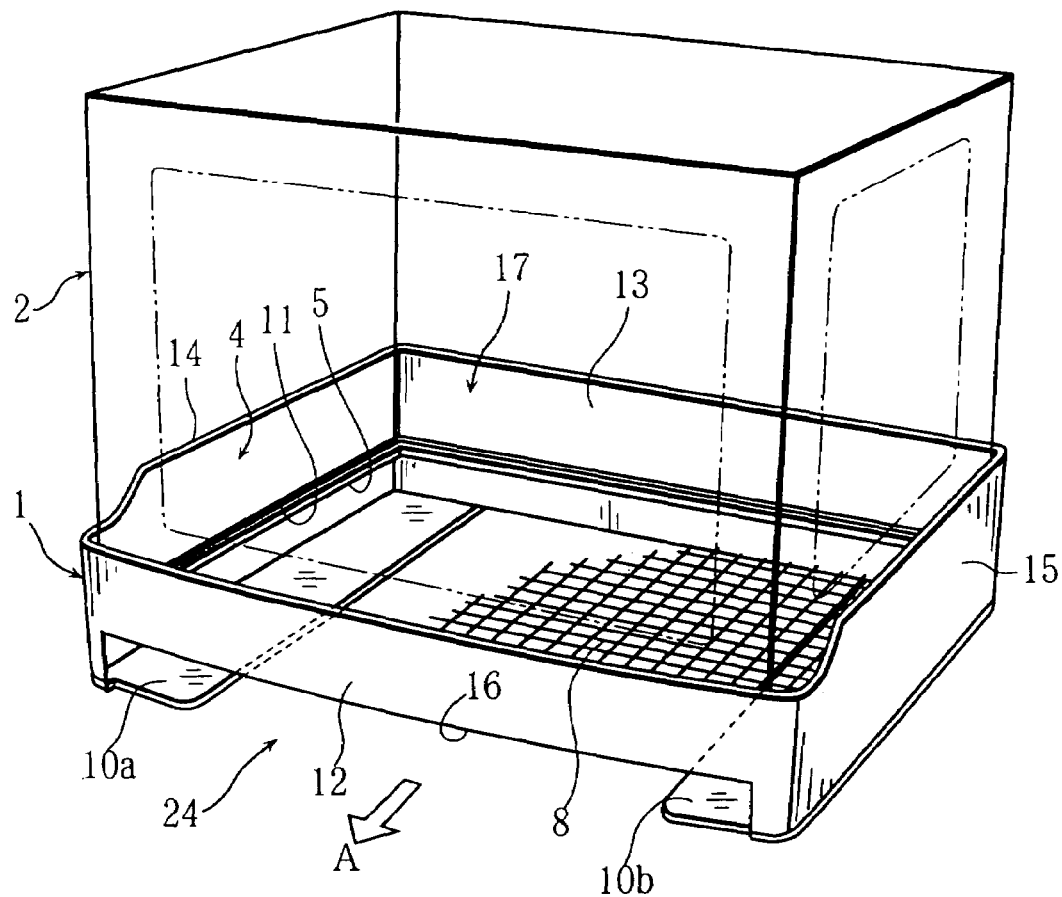
FIG. 2 is a perspective view showing the keeping case for small animals from which a waste-receiving tray is removed.

FIG. 2 shows a state in which the waste-receiving tray 3 is drawn out and removed. The lower receiving base 1 is, for example, made of plastic and having a vertical peripheral wall (side peripheral wall) 4. The peripheral wall 4 has a front wall portion 12, a rear wall portion 13, and left and right side wall portions 14 and 15 all of which are plates, an opening portion 17 is formed upward, and also opens downward (although guide plates 10a and 10b are formed) to be a short cylinder (a short square pipe).

Further, a window portion 16 to which the waste-receiving tray 3 is inserted is formed of notched or opening hole on a part (a lower part of the front wall portion 12) of the peripheral wall 4.

And, a direction in which the waste-receiving tray 3 is drawn out (an arrow A direction) is defined as a longitudinal direction, a direction at right angles with the longitudinal direction is defined as a lateral direction, and the side to which the tray 3 is drawn out is the front side.

The configuration of the lower receiving base 1 may be a short cylinder (not shown in Figures) other than the short square pipe shown in FIG. 1. Further, when the lower receiving base 1 is the short square pipe, angles may be R-shaped, some parts or whole of the front wall portion 12, the rear wall portion 13, and the left and right side wall portions 14 and 15 may be curved. And, as shown with the one-dot broken line in FIG. 1, each of the left and right side wall portions 14 and 15 may have a (staged) configuration in which the rear side is higher than the front side to make the rear wall portion 13 higher than the front wall portion 12.

A lower portion of the small animal container 2 has a peripheral configuration (outline configuration) slightly smaller than the inner peripheral configuration (inner dimensional configuration) of the opening portion 17 of the lower receiving base 1, and the small animal container 2 is inserted to the lower receiving base 1 as to be placed on an inner brim portion 5, formed on the inner face of the lower receiving base 1, and held by the lower receiving base 1. With this construction, the small animal container 2 can be stably held on the lower receiving base 1.

The small animal container 2 shown in FIG. 6 is provided with a peripheral wall portion 19 having opening window portions 18 on the front, rear, left, and right sides, and an upper wall portion 20 covering the peripheral wall portion 19 on the upper side and having a small lid freely opened and closed. The opening window portions 18 are barred (netted) on the front and rear sides, and covered by transparent plates on the left and right sides.

The small animal container 2 may be other than the cage and the case.

The waste-receiving tray 3 is, for example, a shallow dish made of plastic having a bottom wall portion 22 and a low peripheral wall portion 21. The low peripheral wall portion 21 has a peripheral configuration (outline configuration) slightly smaller than the inner peripheral configuration (inner dimensional configuration) of the lower portion of the lower receiving base 1, and the waste-receiving tray 3 is freely drawn in and out by sliding in horizontal and longitudinal directions. A front face of the waste-receiving tray 3 forms one face with an outer face of the peripheral wall 4 (the front wall portion 12) of the lower receiving base 1 when the waste-receiving tray 3 is stored in the lower receiving base 1.

Figure 3:
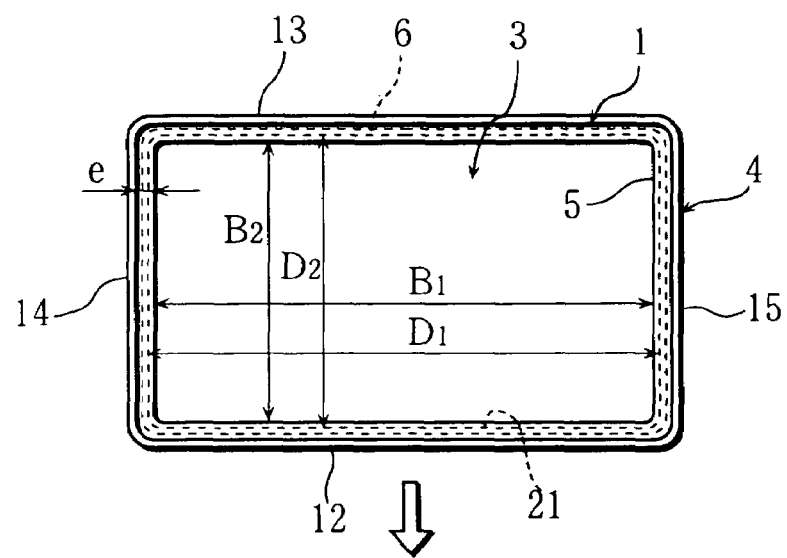
FIG. 3 is a top view of a lower receiving base in which the waste-receiving tray is stored.
Figure 4:
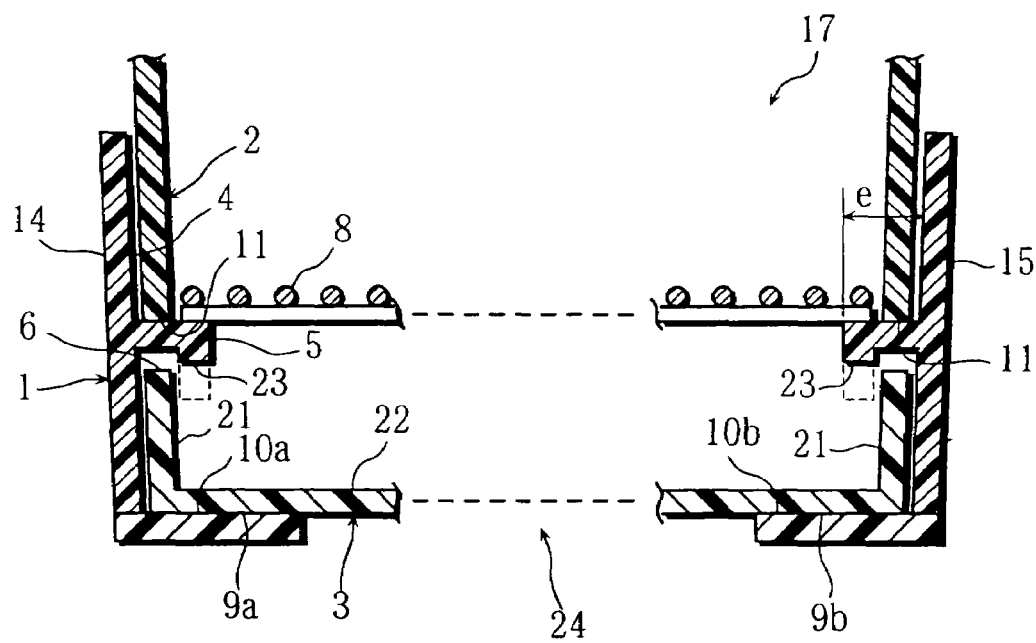
FIG. 4 is a cross-sectional view of a principal portion of the keeping case for small animals.

FIG. 3 is a top view of the lower receiving base 1 when the waste-receiving tray 3 is stored, and FIG. 4 is a cross-sectional view of a principal portion of the keeping case. In the keeping case, the inner brim portion 5, along the peripheral wall 4 (peripherally), is protruding from a middle portion in vertical direction of the inner face of the peripheral wall 4. And, an opening upper edge 6 of the waste-receiving tray 3 is hidden by the inner brim portion 5 in a top view (FIG. 3).

That is to say, the inner peripheral configuration of the inner brim portion 5 is smaller than the inner peripheral configuration of the opening upper edge 6 of the waste-receiving tray 3. Concretely, an inner dimension B, between opposite parts facing on the both sides of a central portion of the peripheral inner brim portion 5 of the lower receiving base 1, is set to be smaller than an inner dimension D of the low peripheral wall portion 21 of the waste-receiving tray 3 corresponding to the opposite parts. In the lateral direction, $B_1 < D_1$, and $B_2 < D_2$ in the longitudinal direction.

The peripheral wall 4 is formed as one unit, and the inner brim portion 5 is unitedly formed with the peripheral wall 4. The inner brim portion 5 is a continuous ring and formed on the same horizontal face. That is to say, the inner brim portion 5, continuously protruding to the horizontal direction, is formed on the same height position with inner face on four sides (inner four faces) of the front wall portion 12, the rear wall portion 13, and the left and right side wall portions 14 and 15 of the peripheral wall 4.

And, as shown in FIG. 4, an inner end portion of the inner brim portion 5 is bent downward to form an L-shaped protruding portion 23 protruding downward to prevent the waste from intruding in an oblique direction between the inner brim portion 5 and the waste-receiving tray 3.

Figure 5:
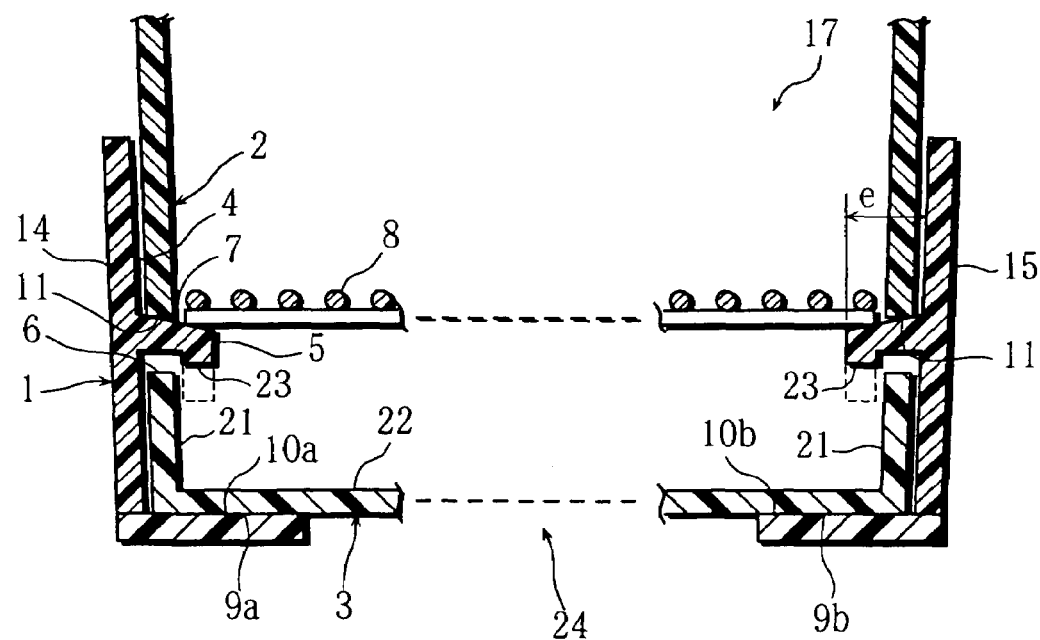
FIG. 5 is a cross-sectional view of a principal portion showing another embodiment of the keeping case for small animals.

Further, as shown with one-dot broken lines in FIG. 4 and FIG. 5, it is preferable further to protrude the protruding portion 23 downward as to wrap (cover) the upper edge portion of the low peripheral wall portion 21 of the waste-receiving tray 3 from the inner side. That is to say, the lower end of the protruding portion 23 is positioned to be lower than the upper edge of the low peripheral wall portion 21. With this construction, the waste is certainly prevented from intruding in the oblique direction. Although not shown in Figures, a notch is formed on an upper end of a rear wall of the low peripheral wall portion 21 of the waste-receiving tray 3 to make the waste-receiving tray 3 drawable (to prevent interference with the protruding portion 23).

FIG. 5 is a cross-sectional view showing another embodiment of the inner brim portion 5 of which upper face is an inclination face (slope face) 7 inclining downward toward the inner side.

Although the position in height direction on which the inner brim portion 5 is disposed on the peripheral face 4 can be freely set, it is preferable to set the position a near position just above the waste-receiving tray 3 to make the lower face of the inner brim portion 5 and the opening upper edge 6 of the waste-receiving tray 3 near for prevention of the intrusion of the waste in the oblique direction.

And, as in FIG. 4 and FIG. 5, a horizontal protruding dimension e from the inner face of the peripheral wall 4 of the inner brim portion 5 is (at least) sufficiently larger than a thickness dimension of the opening upper edge 6 of the waste-receiving tray 3, namely, a thickness dimension of the low peripheral wall portion 21 of the waste-receiving tray 3, and a small dimension on which the opening lower edge 11 of the small animal container 2 and a peripheral portion of the floor plate 8 can be placed.

The horizontal protruding dimension e is preferably 8 mm to 15 mm. When the dimension is less than 8 mm, the whole periphery of the opening upper edge 6 of the waste-receiving tray 3 can not be certainly hidden and the waste may fall out of the waste-receiving tray 3. When the dimension is over 15 mm, the waste may be much accumulated on the upper face of the inner brim portion 5.

And, as shown in FIG. 4 and FIG. 5, the opening lower edge 11 of the small animal container 2, which is opening downward, is placed on the upper face of the inner brim portion 5. The opening lower edge 11 of the small animal container 2 and the lower receiving base 1 (the inner brim portion 5) are hitched (held) by hitching members not shown in Figures, and connected to be united. Therefore, the whole keeping case can be portable by holding upper portions of the small animal container 2 being suspended with the lower receiving base 1.

Further, the floor plate 8 of net is placed on the upper face of the inner brim portion 5. The floor plate 8 is, for example, a flat member of wire formed into grids, and a peripheral configuration of the floor plate 8 is slightly smaller than the inner peripheral configuration of the opening lower edge 11 of the small animal container 2 to place the floor plate 8 and the opening lower edge 11 of the small animal container 2 on the inner brim portion 5.

That is to say, the inner brim portion 5 functions as a placing member of the small animal container 2 and the floor plate 8 on the upper face side, and also as a shielding member of the waste-receiving tray 3 on the lower face side to prevent the waste from falling out of the waste-receiving tray 3.

The net configuration of the floor plate 8, other than the wire formed into grids, includes a flat plate in which many holes are punched.

And, as shown in FIGS. 2, 4, and 5, the guide plates 10a and 10b, receiving left and right edge portions 9a and 9b on the lower face of the waste-receiving tray 3 from the lower side, are formed on the left and right sides on the bottom portion of the lower receiving base 1. Therefore, the lower receiving base 1 is downward-opening with omission of the bottom wall in a middle area in the lateral direction.

The guide plates 10a and 10b are thin plate members formed separately from the peripheral wall 4 and fixed to the left and right sides on the lower portion of the peripheral wall 4 by adhesion, fitting, or hitching. The guide plates 10a and 10b are plate members, of which longitudinal direction is a back-and-forth direction, serve as rail members for the waste-receiving tray 3.

The area of a bottom opening portion 24 (bottomless area) formed between the pair of guide plates 10a and 10b is larger than total area of the guide plates 10a and 10b, and set to be 65 to 90% of the whole (virtual) bottom area of the lower receiving base 1.

As described above, according to the present invention, waste such as excrement, dropped hair, and food of small animals falls certainly into the waste-receiving tray 3, and cleaning is very easy with drawing out the waste-receiving tray 3 because the case is provided with the lower receiving base 1 having the peripheral wall 4 and opening upward, the downward-opening small animal container 2 disposed on the lower receiving base 1, and the upward-opening waste-receiving tray 3 stored in the lower receiving base 1 as to be drawn out, the inner brim portion 5 disposed on the middle portion in the height direction on the inner face of the peripheral wall 4 and protruding along the peripheral wall 4, and the opening upper end 6 of the waste-receiving tray 3 hidden by the inner brim portion 5 in a top view. That is to say, the waste is certainly gathered in the tray 3 without falling out of the tray 3.

And, the construction is simplified without necessity of forming a staged portion on which the small animal container 2 is placed because the opening lower edge 11 of the downward-opening small animal container 2 is placed on and held by the upper face of the inner brim portion 5. The appearance of the case is made preferably simple because the opening lower edge 11 of the small animal container 2 is placed on the inner brim portion 5 and hidden by the peripheral wall portion 4 from the outside, and the peripheral face of the peripheral wall 4 is made a fine vertical smooth face.

And, the waste is smoothly guided to fall and never accumulated on the upper face of the inner brim portion 5 for sanitation because the upper face of the inner brim portion 5 is the inclination face 7 inclining downward to the inner side of the case.

And, the construction of the case is simplified without necessity of forming a staged portion for the floor plate 8 because the floor plate 8 of net is placed on the upper face of the inner brim portion 5.

The inner brim portion 5 functions as a placing member for the floor plate 8 and the small animal container 2 as well as a shielding member to prevent the waste from falling out of the waste-receiving tray 3.

Amount of the material (resin) forming the lower receiving base 1 can be reduced for lower cost and reduction of total weight of the case (in comparison with a conventional double-bottom type) for easy transportation of the case because the guide plates 10a and 10b, receiving left and right edge portions 9a and 9b on the lower face of the waste-receiving tray 3, are formed on left and right sides of the bottom portion of the lower receiving base 1, and the lower receiving base 1 is downward-opening with omission of the bottom wall in a middle area in lateral direction. The bottom wall can be omitted because the waste-receiving tray 3 can certainly receive the waste with the inner brim portion 5.

While preferred embodiments of the present invention have been described in this specification, it is to be understood that the invention is illustrative and not restrictive, because various changes are possible within the spirit and indispensable features.

What is claimed is:

1. A keeping case for small animals comprising:
   a lower receiving base having a peripheral wall, with a front wall portion, rear wall portion, and left and right side wall portions, and opening upward, the peripheral wall having an inner face and an outer face with an inner brim portion, formed as a continuous ring, protruding from the inner face on a middle portion in a height direction of the peripheral wall along said front wall portion, rear wall portion, and left and right side wall portions, the inner brim having a downwardly protruding portion,
   a downward-opening small animal container disposed on the lower receiving base, and
   an upward-opening waste-receiving tray stored in the lower receiving base as to be drawn out, the waste-receiving tray having a peripheral wall with an upper edge which is positioned under the inner brim portion of the lower receiving base and the height of said upper edge is taller than the lower end of the downwardly protruding portion of the inner brim portion, and an upper face of the inner brim portion has an inclination face inclining downward to an inner side of the case.

2. The keeping case for small animals as set forth in claim 1, wherein an opening lower edge of the downward-opening small animal container is placed on and held by the upper face of the inner brim portion.

3. The keeping case for small animals as set forth in claim 1 or claim 2, wherein a floor plate of net is placed on the upper face of the inner brim portion.

4. The keeping case for small animals as set forth in claim 1 or claim 2, wherein guide plates, receiving left and right edge portions on a lower face of the peripheral wall of the waste-receiving tray, are formed on left and right sides of a bottom portion of the lower receiving base, and the lower receiving base is downward-opening with omission of a bottom wall in a middle area in a lateral direction.

5. The keeping case for small animals as set forth in claim 3, wherein guide plates, receiving left and right edge portions on a lower face of the peripheral wall of the waste-receiving tray, are formed on left and right sides of a bottom portion of the lower receiving base, and the lower receiving base is downward-opening with omission of a bottom wall in a middle area in a lateral direction.

* * * * *